US006746719B2

(12) United States Patent
McAndrew

(10) Patent No.: US 6,746,719 B2
(45) Date of Patent: Jun. 8, 2004

(54) PROCESS OF PRIMING A METAL SURFACE FOR ATTACHING RESIN SYSTEMS THERETO UTILIZING AQUEOUS EMULSION OF A POLYFUNCTIONAL EPOXIDE COMPOUND AS THE PRIMER

(75) Inventor: Thomas Page McAndrew, Limerick Township, Montgomery County, PA (US)

(73) Assignee: ATOFINA Chemicals, Inc., Philadelphia, PA (US)

( * ) Notice: Subject to any disclaimer, the term of this patent is extended or adjusted under 35 U.S.C. 154(b) by 0 days.

(21) Appl. No.: 09/971,263

(22) Filed: Oct. 4, 2001

(65) Prior Publication Data

US 2002/0064599 A1 May 30, 2002

Related U.S. Application Data

(60) Provisional application No. 60/240,410, filed on Oct. 13, 2000.

(51) Int. Cl.[7] ............................... B05D 1/36; B05D 7/16
(52) U.S. Cl. ....................................... 427/410; 523/403
(58) Field of Search ................................. 523/403, 410, 523/414, 423; 427/402, 407.1, 409, 410; 106/14.05, 14.11

(56) References Cited

U.S. PATENT DOCUMENTS 3,020,250 A * 2/1962 Norwalk ..................... 523/417
3,983,056 A * 9/1976 Hosoda et al. ............... 523/403
4,289,826 A * 9/1981 Howell, Jr. .................. 428/418
4,308,183 A  12/1981 Williams ................. 260/18 EP
4,374,213 A * 2/1983 Dickie et al. ................ 523/416
5,001,173 A * 3/1991 Anderson et al. ........... 523/406
5,026,440 A * 6/1991 Finnenthal et al. ......... 148/247
5,260,357 A * 11/1993 Sachdeva .................... 428/416
5,266,611 A * 11/1993 Teschendorf ................ 428/416
5,891,515 A * 4/1999 Dutheil et al. .............. 427/185
6,018,000 A * 1/2000 Keeny et al. ............. 428/474.4
6,251,515 B1 * 6/2001 Douais et al. .............. 428/323
6,258,875 B1 * 7/2001 Vogt-Birnbrich et al. ... 523/415

FOREIGN PATENT DOCUMENTS

| DE | 2 242 542 | * | 3/1973 | ............ C09D/3/58 |
| EP | 0354822 A1 | | 2/1990 | |
| EP | 0 517 471 A2 | * | 12/1992 | |
| GB | 1 380 108 | * | 3/1972 | ............ C08L/63/00 |

* cited by examiner

Primary Examiner—Bret Chen
Assistant Examiner—William P. Fletcher, III
(74) Attorney, Agent, or Firm—William D. Mitchell

(57) ABSTRACT

An improved process for priming a metal surface to improve the adhesion to the surface of a resin coating possessing functional groups that react with epoxide groups, such as amide functionality containing polyamide resins.

8 Claims, No Drawings

US 6,746,719 B2

PROCESS OF PRIMING A METAL SURFACE FOR ATTACHING RESIN SYSTEMS THERETO UTILIZING AQUEOUS EMULSION OF A POLYFUNCTIONAL EPOXIDE COMPOUND AS THE PRIMER

This application claims priority from provisional application No. 60/240,410, filed Oct. 13, 2000.

BACKGROUND OF THE INVENTION

This invention relates to compositions of matter classified as coatings, where thicknesses of said coatings are governed by the methods of application. More specifically this invention relates to coatings applied to metal surfaces, where both the coating and the metal possess functional groups that react with epoxide groups, and the method of application is by powder coating methods or melt processing methods or liquid methods. Still more specifically, this invention relates to amide containing resins applied by powder coating methods or melt processing methods, and fluoropolymer based resins applied by liquid methods.

This invention enables the strong attachment of coatings to substrates (this strong attachment is ordinarily embodied as good adhesion and good resistance to corrosion), while at the same time minimizing deleterious environmental effects from its use.

BACKGROUND ART

For a great many uses, in order to obtain strong attachment of coatings to the surfaces on which they are applied, particularly metal surfaces, a primer is used. This is especially true for resin systems comprising amide groups, in particular resin systems comprising substantially polyamide 11 or polyamide 12 applied by powder coating methods or melt processing methods. It is likewise especially true for resin systems comprising substantially poly(vinylidene fluoride) applied by liquid methods. If additional corrosion resistance is desired, a corrosion inhibitor such as a chromium compound, is placed in the primer. Since chromium compounds are considered as health risks, and their use is strictly legislated, elimination of their use is desirable.

To applicant's knowledge, all such primers for resin systems comprising substantially polyamide 11 applied by powder coating methods are organic solvent based and contain epoxy compounds. Corrosion inhibitors used in such primers ordinarily contain chromium compounds. No art is known which suggests that an aqueous based epoxy compound containing primer composition can be substituted successfully for organic solvent based epoxy primers, much less that such substitution will allow elimination of the chromium containing anti-corrosion agents without sacrificing adhesion or corrosion resistance.

Such substitution is desirable because it enables reduction of the emission of volatile organic compounds (VOCs) inherent in the use of the present organic solvent based primers and the elimination of the presence of toxic chromium containing compounds.

SUMMARY OF THE INVENTION

The invention provides in a first process aspect, an improved process for priming a metal surface to improve the adhesion to said surface, and other properties, of resin coatings which possess functional groups that react with epoxide groups, wherein the improvement comprises applying an emulsion in water of a polyfunctional epoxide compound to said surface. Such resin coatings include, but are not necessarily limited to, amide containing resins applied by powder coating methods or melt processing methods, and fluoropolymer-containing resins applied by liquid methods.

The tangible embodiments produced by the first process aspect of the invention possess the inherent applied use characteristics of improving the wetting and adhesion of said coatings. In addition, the improvements are provided with emissions of VOCs, if any, in a range well below that required by present air quality regulations and well below that required by any such regulations presently foreseeable in the future. The tangible embodiments also provide for enabling improved corrosion resistance for the metal substrate to which the coating is adhered without the use of toxic chromium compounds.

Special mention is made of those aspects of the first process aspect of the invention wherein the polyfunctional epoxide compound is a substantially difunctional epoxide.

The invention provides in a first composition aspect, a metal object having on at least one surface a primer coating prepared by the first process aspect of the invention.

The invention provides in a second process aspect, a process for the application of an adherent coating based on amide containing resins applied by powder coating methods or melt processing methods, and fluoropolymer containing resins applied by liquid methods which comprises applying said coating to the surface of an object comprising the first composition aspect of the invention.

Special mention is made of this process aspect of the invention where the coating is: (a) a resin comprising substantially polyamide 11 or polyamide 12, that is applied by powder coating methods, or (b) a resin comprising substantially any polyamide polymer that is applied by melt processing methods, or (c) a resin comprising substantially poly(vinylidene fluoride) that is applied by liquid methods.

The invention provides in a second composition aspect, a coated object produced by the second process aspect of the invention.

DETAILED DESCRIPTION

The mode and manner of practicing the invention will now be described with respect to specific embodiments thereof, namely: (a) steel panels coated on at least one surface with a coating produced by applying a powder coating product comprising substantially polyamide 11 by conventional powder coating methods to the surface of the steel panel on which an aqueous emulsion of a substantially difunctional epoxide has been applied, (b) steel tubes coated on inside and/or outside surface with a coating produced by applying a resin product comprising substantially polyamide 12 by conventional melt extrusion methods (a common melt processing method) to the surfaces of the steel tubes on which an aqueous emulsion of a substantially difunctional epoxide has been applied, and (c) steel panels coated on at least one surface with a coating produced by applying a product comprising substantially poly(vinylidene fluoride) by conventional liquid coating methods to the surface of the steel panel on which an aqueous emulsion of a substantially difunctional epoxide has been applied.

Coatings such as these, on metal surfaces such as steel, aluminum and the like are well known. Ordinarily such coatings also include, in addition to the resins cited, optionally, coloring agents, inorganic fillers, flow modifying agents and other compatible polymers.

These products cited are well-known commercially available products. Powder coating products comprising substantially polyamide 11 are sold by ATOFINA Chemicals, Inc. under the name RILSAN Fine Powders (also referred as "RFP"). Resin products comprising substantially polyamide 12 that are applied by conventional melt extrusion methods are sold by ATOFINA Chemicals, Inc. under the name RILSAN. Liquid products comprising substantially poly(vinylidene fluoride), that are applied by conventional liquid methods are sold by a variety of companies, e.g., PPG, Inc., and bear the trademark KYNAR.

Powder Coatings: The present invention also contemplates as fully equivalent, and one of skill in the art will understand such equivalency based on the present teaching, use of the contemplated aqueous based primers as primers for powder coating products other than such products comprising polyamides 11 and 12. Such equivalents comprise, for example, polyamide 6, polyamide 6/6 and polyamide 10 as well as blends in any combination of these polyamides with polyamide 11 and/or 12. Also contemplated is use with copolymers in any combination, for example made from the monomers for polyamides 6, 6/6, 10, 11 and 12 and, in addition, powder coating products containing blends in any combination of the aforementioned polyamide or amide based products. Said polymers, polymer blends and copolymers are commercially available and are offered by such companies as DuPont and ATOFINA Chemicals, Inc. Still further contemplated as an equivalent is use of the aqueous primers of the invention as primers for any powder coating product comprising a polymer containing functionality capable of reacting with epoxide functionality at or below temperatures normally employed in thermal processing of said powder coating. Non-limiting examples of such materials are polymers containing hydroxyl, amine, amide and acid functional groups. Of particular note is a powder coating product comprising a fluoropolymer-based material, such as poly(vinylidene fluoride) and a polymer with functionality, e.g., acrylic acid groups, capable of reacting with epoxide groups.

Resin Coatings:

The present invention also contemplates as fully equivalent, and one of skill in the art will understand such equivalency based on the present teaching, use of the contemplated aqueous based primers as primers for resin products, that are applied by conventional melt processing methods, other than such products comprising polyamides 11 and 12. Such equivalents comprise, for example, polyamide 6, polyamide 6/6 and polyamide 10 as well as blends in any combination of these polyamides with polyamide 11 and/or 12. Also contemplated is use with copolymers in any combination, for example made from the monomers for polyamides 6, 6/6, 10, 11 and 12 and, in addition, powder coating products containing blends in any combination of the aforementioned polyamide or amide based products. Still further contemplated as an equivalent is use of the aqueous primers of the invention as primers for any resin product comprising a polymer containing functionality capable of reacting with epoxide functionality at or below temperatures normally employed in thermal processing of the resin. Non-limiting examples of such materials are polymers containing hydroxyl, amine, amide and acid functional groups. Of particular note is a coating product comprising a fluoropolymer-based material, such as poly(vinylidene fluoride), and a polymer with functionality, e.g., acrylic acid groups, capable of reacting with epoxide groups.

Liquid Coatings:

The present invention also contemplates as fully equivalent, and one of skill in the art will understand such equivalency based on the present teaching, use of the contemplated aqueous based primers as primers for coating products applied by conventional liquid coating methods. Such utility will extend to any liquid coating product comprising a polymer having functionality similar to that described above for powder coating or resin products, i.e., hydroxyl, amine, amide and acid functional groups capable of reacting with epoxide functional groups at or below the normal processing temperatures of said products. Of particular note is a liquid coating product comprising a fluoropolymer-containing resin, such as poly(vinylidene fluoride), and a polymer with functionality, e.g., acrylic acid groups, capable of reacting with epoxide groups.

The presently cited products are all applied to metal surfaces by standard well known methods to form uniform continuous coatings on the metal objects. For convenience, coatings made from powder coating products comprising substantially polyamide 11 will be referred to hereinafter as RFP coatings. Such coatings made from resin products comprising substantially polyamide 12, and applied by melt processing methods, will be referred to hereinafter as Rilsan coatings. Such coatings made from coating products comprising substantially poly(vinylidene fluoride), and applied by liquid coating methods, will be referred to as Kynar coatings. The chemical compositions of these coatings in virtually all cases are essentially the same as the solid phase of the coating product.

For reference, the principal coating applications methods germane to the present invention are described below:

(A) Powder Coating by Electrostatic Spray:

With this method, ordinarily ES grade RFP product is applied by an ES spray gun (commonly available from companies such as Nordson Corp. and ITW Gema, Inc., the operation of which is not critical to the invention and will not be described here) onto a grounded metal object. Then said metal object is ordinarily placed into an oven set substantially above the melting point of the RFP product (ordinarily at about 220° C.; RFP product melts at about 185° C.) for a period of time that is ordinarily several minutes longer than that required for melting to occur. The temperature and time are not critical as long as the combination is sufficient to fuse the coating into coherency and not so excessive as to cause decomposition of the coating or primer. Under such conditions, the RFP product that was adhered to said metal object melts to form the uniform, continuous, smooth RFP coating that was described above. Ordinarily with this method, coating thicknesses of about 4–8 mils (about 100–200 microns) can be obtained.

(B) Powder Coating by Immersion in a Fluidized Bed ("FB"):

With this method, the metal object to be coated is ordinarily preheated in an oven under conditions such that when said metal object is removed from said oven and subsequently immersed in a tank containing FB grade RFP product in a fluidized state, the temperature of said metal object is substantially above that of the melting point of RFP product (RFP product melts at about 185° C.). Under such conditions, the RFP product (i.e., powder) that comes in contact with the metal object surface, or already melted RFP product, melts and adheres to the metal object. Once again, the time and temperature are not particularly critical as long as the same requirements as described above for electrostatic coating are observed. This action produces the uniform, continuous, smooth RFP coating that was described above. Ordinarily the immersion time of said metal object is about 3–5 seconds. Ordinarily with this method, coating thicknesses of at least about 10 mils (about 250 microns) can be obtained.

(C) Coating With Resin:

With this method, melted resin is mechanically forced into contact with the metal object to be coated. This forced contact may occur in a variety of ways, such as by injection molding methods or by extrusion methods. Thickness of the resultant coating may be as high as several inches, but often is on the scale of 10 to 50 mils. The metal article may be, or may not be, at elevated temperature when said forced contact occurs. The thickness of the resultant coating is governed by the equipment employed.

(D) Coating With Liquid Coating:

With this method, liquid coating product is applied onto the metal object to be coated, by any of several standard methods such as spray coating, coil coating, draw down, etc. The thickness of the resultant "wet" coating may be as high as about 5 mm. Drying may be done with, or without, elevated temperatures. Ordinarily however, often for the purposes of time, resultant coatings are dried at elevated temperatures. The thickness of the resultant "dry" coating is a function of the solids content of the liquid, but thickness may be as high as about 3 mm.

Regardless of the method of coating employed, the water contained in the primer after it is applied to the surface of the object to be coated, may be allowed to remain in the primer during application of the coating, or it may be partially or wholly removed, all at the option of the operator who will adjust water content to optimize the operation being performed. Ordinarily, said water is substantially removed prior to start of the coating process.

Ordinarily, for electrostatic application of the powder coating material, the primed metal object is not preheated. Instead, the powder coated object has heat applied after coating is complete to coalesce and bond the coating to the object.

For fluidized bed coating, on the other hand, the primed object ordinarily is preheated to a temperature sufficient to coalesce and bond the coating to the object before immersion in the fluidized bed.

All variations of the above described techniques of application are contemplated as equivalents in the processes of the invention described and claimed herein as they are simply varying expedients which a skilled operator can adjust to optimize the particular operation being performed.

Ordinarily critical to long-term, good performance of a coating is good adhesion between said coating and the surface of the metal object on which it resides (it is added that, ordinarily, good performance of any type is contingent upon good adhesion between said coating and the surface of the object on which it resides). In many cases, obtaining said adhesion requires the presence of a suitable layer between the coating and the metal surface. This layer is called the primer layer. A primer layer is a thin layer (ordinarily about 2–10 microns thick) that is placed onto the metal surface prior to application of the coating. To be effective, a primer layer must satisfy three criteria:

it must itself adhere well to the metal surface;

it must possess a surface energy such that the attraction of the coating for it is greater that the attraction of the coating for itself; and it must provide for good adhesion between the coating and metal surface (it is generally reckoned that this occurs by the action of the primer layer formation of direct, covalent, chemical bonds between the coating and the metal surface).

If a primer layer fails to satisfy any of these three criteria, it can not be considered acceptable.

Primer layers on metal objects are applied by the use of primer products. In particular, primer products for use with RFP products ordinarily comprise a resin component (i.e. the compound that will constitute the primer layer) dissolved in an organic solvent. It is believed that in all commercially available primer products for RFP products, the active resin component is a diepoxide. An example of such a primer product is Rilprim® P, offered by ATOFINA. Optionally, the primer product may contain corrosion inhibitors (e.g., chromium containing compounds), so that after application of primer product on metal surface, some corrosion inhibitors are present in the primer layer and on said metal surface. An example of such a product is Rilprim 204-A/104-B, also offered by ATOFINA.

Primer products for RFP products in particular, and coatings in general, are ordinarily used in the following manner. Primer product is applied to a metal surface, ordinarily, by spraying with a spray gun (usually air driven), by painting with a paint brush, or by dipping said metal surface into a container of primer product. After this, the resultant coating is allowed to "dry" for at least about 5–30 minutes. This "drying" process comprises the evaporation of organic solvents that were applied with primer product. After said evaporation, remaining on said metal surface is a thin layer (ordinarily about 2–10 microns) of the resin component, i.e., the primer layer.

During the powder coating process, RFP product is deposited onto this primer layer and is then subjected to a thermal treatment (as described above) that causes melting to form a smooth, continuous, uniform coating. It is believed that at the elevated temperatures employed to cause RFP product melting, two distinct chemical reactions occur: (a) one end of a diepoxide molecule reacts with hydroxyl groups at the metal surface to form ether linkages, and (b) one end of the same diepoxide molecule reacts with amide groups of Nylon-11 (polyamide 11) to form imide linkages. These two distinct chemical reactions have the net result of causing direct, covalent, chemical bonding between the RFP coating and the metal surface. It is emphasized that this explanation is simply a working hypothesis. The correctness, or lack thereof, of said hypothesis does not affect the utility of primer products. In particular, while it is believed that elevated temperatures are needed for this reaction to occur, it is possible that this reaction occurs at room temperature.

In the case of powder coating by electrostatic spray, a primer product almost always must be used. In this process, during the time that the RFP product is molten, the attraction of Nylon-11 molecules among themselves is stronger than the attraction of Nylon-11 molecules to unprimed metal surface. Thus, while in the molten state, RFP product ordinarily does not adhere to unprimed metal surface, but rather gathers upon itself and falls off. The presence of a primer layer prevents this. In a large percentage of cases where a RFP product is used, a primer product is used.

In the case of the resin coating process, melted resin product is forced into contact with this primer layer. As in the case of powder coating, it is believed that at the elevated temperatures employed to cause melting, the two distinct chemical reactions cited above occur: one epoxide group of the primer reacts with the metal surface, and the other epoxide group of the primer reacts with a group in the resin. In the case where the resin product is substantially a polyamide, the group reacting in the resin would be an amide group. These two distinct chemical reactions have the net result of causing direct, covalent, chemical bonding between the coating and the metal surface. It is further noted that depending upon the reactivity of the groups in the resin, elevated temperatures may not be needed.

In the case of the liquid coating process, liquid coating is deposited onto this primer layer. The thermal energy that is employed to remove the liquid phase of this coating is sufficient to cause the two cited distinct chemical reactions to occur: one epoxide group of the primer reacts with metal surface, and the other epoxide group of the primer reacts with a group in the resin. These two distinct chemical reactions have the net result of causing direct, covalent, chemical bonding between coating and metal surface. It is further noted that depending upon the reactivity of the groups in the resin, elevated temperatures may not be needed.

From an exclusively technical/performance perspective, currently available primer products work very well. In the case of RFP coatings, they provide for excellent adhesion between RFP coatings and metal surfaces, and good protection of metal from corrosion (especially when a corrosion inhibitor is used). However, extant/proposed legislation in Europe and North America will soon restrict very severely the use of said current products, because of:

presence of high levels of volatile organic components (VOC's). For example, Rilprim P is about 90% (by weight) organic solvents (that is, VOC's are present at about 6 lbs/gallon); and presence of corrosion inhibitors that are considered toxic (e.g., chromium containing compounds).

Thus, there is an extremely strong need to develop primer systems for RFP products, and coatings in general, that do not suffer from either of the above two issues. This need assumes an even greater sense of urgency when considered that a customer who does not have an acceptable primer product will not be able to always employ RFP products, and many coating products in general. Thus, availability of primer products that do not suffer from either of the above two issues, will continue to permit use of RFP products, and many coatings products in general.

Therefore, an effort was undertaken to develop primer products that have low levels of VOC's (preferably 0%) and employ corrosion inhibitors that are environmentally compliant. Such a primer product will be hereafter referred to as "low VOC, no chrome primer product (LVNC product)". The initial intent of developing such a primer product was for use with RFP products. However, said LVNC product also provides benefit for resin coatings and liquid coatings.

At first, the approach chosen to develop a LVNC product was to simply translate the above discussed diepoxide chemistry into a water soluble system. As discussed, most primer products comprise a solvent soluble diepoxide. In Table 1 are listed the water soluble diepoxide compounds that have been reported in the literature, along with where selected compounds are commercially available. As a practical matter, it is generally unwise to develop a technology based upon a product that is not commercially available. Consequently, only Compounds 1, 2 and 6 from Table 1 were considered. Compound 3, although commercially available, was not considered further because of the fact that it is a cancer suspect agent.

TABLE 1

Water Soluble Diepoxides:

| | |
|---|---|
| 1. | Poly(propylene glycol) diglycidyl ether (MW about 640 available from Aldrich Chem. Co. & Crescent Chem. Co. |
| 2. | Poly(propylene glycol) diglycidyl ether (MW about 380 available from Aldrich Chem. Co. |
| 3. | 1,7-Octadiene diepoxide (toxic, cancer suspect) available from Aldrich Chem. Co. |
| 4. | DEG-1 (diethylene glycolephichlorohydrin copolymer) - source not known |
| 5. | TEG-1 (triethylene glycolephichlorohydrin copolymer) - source not known |
| 6. | 1,2,3-propanetriol, polymer with chloromethyloxirane, available from Raschig Corp. |
| 7. | 1,4-pentadiene diepoxide - source not known |
| 8. | 1,5-hexadiene diepoxide - source not known |
| 9. | 1,6-heptadiene diepoxide - source not known |
| 10. | 1,8-heptadiene diepoxide - source not known |
| 11. | 1,9-decadiene diepoxide - source not known |
| 12. | 5,5-dimethyl-1,3-bis(oxiranylmethyl) imidazolidine-2,4-dione - source not known |

Individual solutions (in deionized water) of Compounds 1, 2 and 6 were prepared such that if all of said Compound had dissolved, the solution concentration would be 10% (by weight). Said solutions were applied by casting (using pipette) onto the polished sides of carbon steel panels (Q-Panel Co. Type S-36-1, cleaned by soaking in toluene, followed by wiping with a toluene-soaked soft paper tissue) while said panels were lying flat. Said solutions were allowed to remain in such position for 5–6 minutes. Then panels were turned upright (i.e., perpendicular to the floor) and excess solution allowed to run off, after which the panels were maintained in such a perpendicular position for about 24 hours at room temperature in air. Said panels were then coated by the standard ES method using the RFP product, Natural ES (a product that is essentially pure Nylon-11 polymer). Subsequent thermal treatment was at 220° C. for 10 minutes. Compounds 1, 2 and 6 did not provide for complete wetting of the carbon steel panels (i.e., complete coverage of panels was not achieved) by RFP coatings. Note that RFP coatings did not fall off of said carbon steel panels during thermal treatment. Still, however, wetting was not complete. Thus, Compounds 1, 2 and 6 could not be considered as satisfactory for a commercial primer product. The reason that water soluble diepoxides, such as Compounds 1, 2, and 6 do not provide for complete wetting is not known. It would seem that the only thing required for complete wetting, and good adhesion, would be to have diepoxide molecules present on the surface of metal. The manner by which said diepoxide molecules are placed on said surface should not matter. Clearly, however, this is not the case.

Given the fact that the performance of water soluble diepoxides was not adequate, consideration was given to water dispersed diepoxides (i.e., diepoxide emulsions). A survey of commercial literature identified the products listed in Table 2, each of which is an emulsified diepoxide with an approximate concentration (weight percent solids) of 50%.

Table 2—Water Dispersed Diepoxides

1. Araldite PZ-3902 from Vantico, Inc. having an epoxy functionality equivalent of 2.0

2. Araldite PZ-3901 from Vantico, Inc. having an epoxy functionality equivalent of 2.3

3. Waterpoxy WEX-13-258 from Henkel Corp. having an epoxy functionality equivalent of 2.0

An experimental evaluation of the compounds listed in Table 2 was performed. Individual suspensions (in deionized water, 15% by weight) of each product were prepared. Carbon steel panels (Q-Panel Co. Type S.-36, cleaned by soaking in toluene, followed by wiping with a toluene-soaked soft paper tissue) were treated by immersion in said suspensions for about 5 minutes. The panels were then removed and excess solution allowed to run off. Drying of the treated panels was in a perpendicular position for about 24 hours at room temperature in air. The panels were then coated by the standard ES method using the RFP product, Natural ES. Subsequent thermal treatment was at 220° C. for 10 minutes.

Araldite PZ-3901 (henceforth referred to as PZ) and Waterproxy WEX-13-258 (henceforth referred to as WEX) each achieved complete wetting and an adhesion rating of 3 (the rating criteria are given in Table 3). Employing suspensions (about 10% by weight) applied essentially as described above, it was judged that Araldite PZ-3902, while it did provide for wetting, a smooth coating and initial adequate adhesion, did not have performance as good as either PZ or WEX. This was determined by the adhesion maintained after immersion in boiling water, of cut and cross-hatched samples. Therefore, further work with PZ-3902 was not performed. For comparison, two standard solvent based primer products: Rilprim P (at a concentration of about 10 weight %) and Rilprim 204-A/104-B (at a concentration of about 17 weight %) were tested and also achieved complete wetting and an adhesion rating of 3. Rilprim 204-A/104-B contains corrosion inhibiting chromate compounds, whereas Rilprim P does not contain any corrosion inhibiting compounds. These primers were employed according to standard procedures. The carbon steel panels (Q-Panel Type S-36) employed for evaluation of solvent based primers were prepared in a manner identical to that just described. Likewise, coating with RFP product (i.e., Natural ES) was done in exactly the same manner.

The fact that both of the emulsified diepoxides considered, PZ and WEX, provided for wetting and adhesion as good as either of the two solvent based standards was surprising. An epoxide molecule wrapped in an emulsion particle should not be free to link a Nylon-11 molecule to a metal surface. While not being bound by a particular theory, it is believed that during the thermal processing that is employed to melt the RFP product, the emulsion particles that are resident upon the steel surface break open and free the diepoxide molecules contained therein, thus making the diepoxide molecules free to react with the metal surface and the polyamide.

Table 3. Parameters of the Knife Scrape Adhesion Test (This Test is Performed on a Scribed Approximately 0.25 Inch Wide Strip With a Stanley® Utility Knife):

Rating 4—can not initiate a tab

Rating 3—can initiate a tab, but Nylon-11 breaks upon pulling with pliers

Rating 2—Nylon-11 can be peeled back with effort

Rating 1—Nylon-11 can be peel back easily

Rating 0—Nylon-11 lifts off spontaneously

A further objective of the present effort was to identify environmentally compliant corrosion inhibiting pigments. Of several different commercially available systems examined, two were found to provide benefit with either PZ or WEX:

Halox Pigments SW-111 (calcium strontium phosphosilicate) (Halox Co.) Said SW-111 was employed in a properly pigment-dispersed state, dispersed in water with Rohm and Haas Tamol® 731A (surfactant) and Henkel Corp. Nopco® NXZ (surfactant); and 9 parts to 1 part mix (by weight) of zinc phosphate and Henkel Corp. A-827 (Zn salt of an amine compound).

Through subsequent matrices of experiments, it was determined that a preferred embodiment of the present invention comprises 5% PZ (by weight, solids), with 1% (by weight) phosphoric acid. Such a composition comprises over 90% (by weight) water. If enhanced corrosion protection is desired, the invention can be adjusted to also contain 4% SW-111 (by weight, solids and properly dispersed).

The performance of various formulations contemplated by the invention in comparison to Rilprim P and Rilprim 204-A/104-B were tested for adhesion of RFP coating and resistance to RFP coating lift off in a salt fog (operated substantially according to ASTM B-117). The following may be concluded:

The water based primer systems presently described provide for wetting and adhesion by RFP coatings as good as that provided by the standard solvent based primer systems, Rilprim P and Rilprim 204-A/104-B. It is not known why water soluble diepoxides do not provide for performance as good as that provided by water dispersed diepoxides.

The above cited good adhesion is achieved even when corrosion inhibiting pigments (insoluble in water) are employed. It would have been expected that the presence of said corrosion inhibiting pigments would have provided for diminished adhesion. Quite happily, but contrary to expectation, adhesion with corrosion inhibitors is essentially as good as adhesion without corrosion inhibitors. The reason for this fortunate occurrence is not known.

The water based primer systems presently described provide for resistance to corrosion and maintenance of adhesion under salt fog exposure conditions at least as good as that of standard solvent-based primer systems like Primer P. The presence of corrosion inhibitors can, however, impart an extra measure of corrosion resistance.

The subject matter which applicant regards as his invention is particularly pointed out and distinctly claimed as follows:

1. An improved process for priming a metal surface to improve the adhesion to said surface of a resin coating which possesses functional groups that react with epoxide groups, which resin is applied by powder coating, melt processing or liquid methods, the improvement consisting essentially of applying to said surface as the primer a chromium-free emulsion in water consisting essentially of a polyfunctional epoxide compound and water.

2. A process as defined in claim 1 wherein the polyfunctional epoxide compound has a functionality of two.

3. A process as defined in claim 1 wherein the polyfunctional epoxide compound has a functionality greater than two.

4. A process for the application to a metal surface which has been primed as in claim 1 of an adherent resin coating which possesses functional groups that react with epoxide groups, which process comprises applying said resin to the primed surface by powder coating, melt processing or liquid methods.

5. A process as defined in claim 4 wherein the resin comprises amid containing resin applied by powder coating or melt processing methods.

6. A process as defined in claim 5 wherein the resin comprises polyamide 11 or polyamide 12.

7. A process as defined in claim 4 wherein the resin comprises a fluoropolymer.

8. A process as defined in claim 7 wherein the resin comprises poly(vinylidene fluoride).

* * * * *